United States Patent Office 3,496,797
Patented Feb. 24, 1970

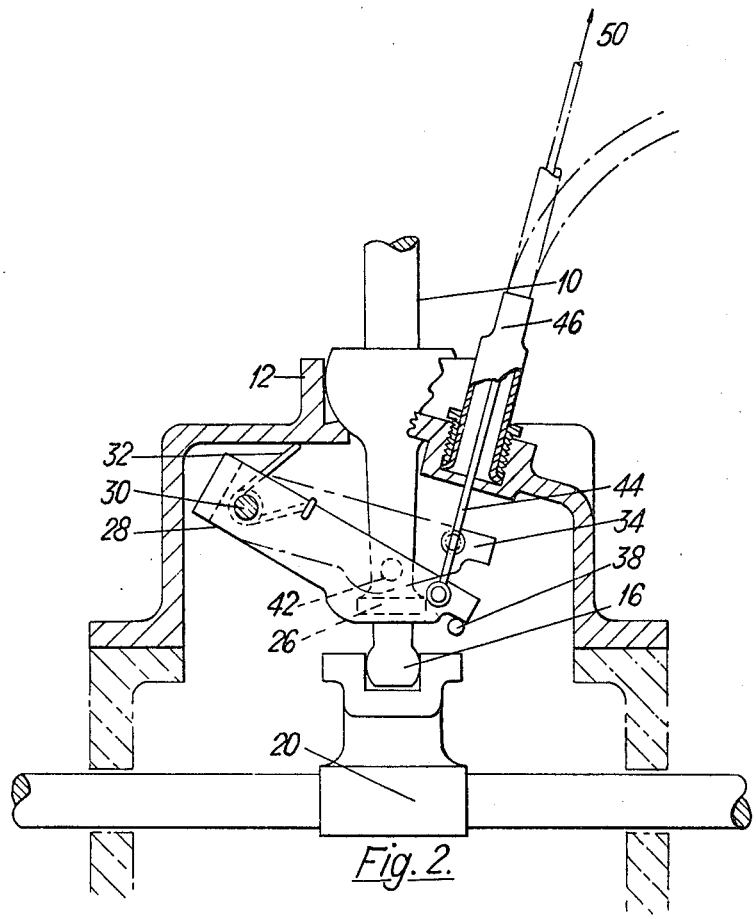
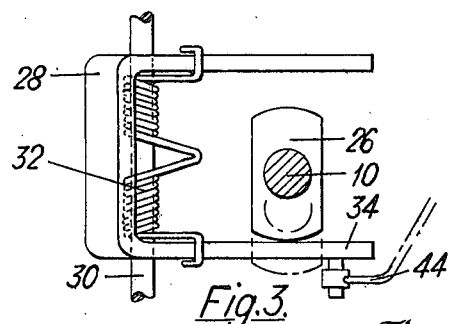

3,496,797
GEARSHIFT MECHANISMS FOR
MOTOR VEHICLES
Thomas Charles Felix Stott, Harpenden, and Mario Joseph Maina, Luton, England, assignors to General Motors Corporation, a corporation of Delaware
Filed Mar. 12, 1968, Ser. No. 712,453
Claims priority, application Great Britain, Mar. 30, 1967, 14,536/67
Int. Cl. F16h 57/06; G05g 9/00, 13/00
U.S. Cl. 74—476
16 Claims

ABSTRACT OF THE DISCLOSURE

A gearshift mechanism for a motor vehicle has a gearshift lever which is pivotally mounted in a housing, and is selectively engageable with a number of gear selector members. A spring-loaded stop member, which may comprise a U-shaped plate, is pivotally mounted in the housing: in a first, rest position the stop member blocks engagement of the gearshift lever with one or a pair of the gear selector members, but operation of a control cable or other control member moves the stop member into a second position in which it does not give the blocking action.

---

This invention relates to gearshift mechanisms for motor vehicles.

According to the invention, a gearshift mechanism for a motor vehicle comprises a gearshift lever which is pivotally mounted in a housing and is manually movable for selective engagement with a plurality of gear selector members, a stop member which is pivotally mounted in the housing and is biased towards a first position preventing engagement of the gearshift lever with a first one of the gear selector members, and a control member operable to move the stop member into a second position allowing engagement of the gearshift lever with the said first gear selector member.

The stop member in its first position may also prevent engagement of the gearshift lever with a second one of the gear selector members: for example the first and second gear selector members may comprise the two outermost ones of a row of gear selector members. For instance, for selecting gear ratios in a gearbox giving six forward ratios and a reverse ratio, there may be four of the gear selector members arranged in a row side by side, with the first gear selector member comprising one of the outermost members and being arranged for selecting reverse and first ratio, and the second gear selector member comprising the other outermost member and being arranged for selecting the sixth forward ratio, which may be an overdrive ratio. The gear selector members are conveniently mounted for sliding movement relative to the housing.

The stop member may comprise a U-shaped plate, which is conveniently pivotally mounted in the housing by means of a pivot disposed in the region of the base of the U.

The pivot for the U-shaped stop member conveniently comprises a pivot pin carried by the stop member in the region of the base of the U: the biasing spring for the stop member may be a mouse-trap spring mounted on the pivot pin forming the pivotal mounting for the stop member. The gearshift lever conveniently has a projecting abutment portion which, in the first position of the U-shaped stop member, is disposed in the region between the two arms of the U, for engagement with one or other of the arms to prevent the engagement of the gearshift lever with the corresponding gear selector member. An opposed pair of pins may project from the housing in which the stop member is pivotally mounted, the pins being arranged to provide reaction for the arms of the U-shaped stop member when the arms are engaged by the gearshift lever.

The pivotal movement of the stop member from its first to its second position, in opposition to the bias of the spring, is preferably an upward movement.

The control member for moving the stop member from its first to its second position may comprise a control cable, for example a Bowden cable. The control member is preferably operable from a position adjacent a manual control knob of the gearshift lever.

The preferred embodiment of invention and how it can be performed are hereinafter particularly described with reference to the accompanying drawings, in which:

FIGURE 2 is a fragmentary longitudinal section of the embodiment of a motor vehicle gearshift mechanism according to the invention which is shown in FIGURE 1; and FIGURE 3 is a fragmentary plan showing details of a pivotally mounted U-shaped stop plate forming part of the gearshift mechanism shown in FIGURES 1 and 2.

Figure 1:
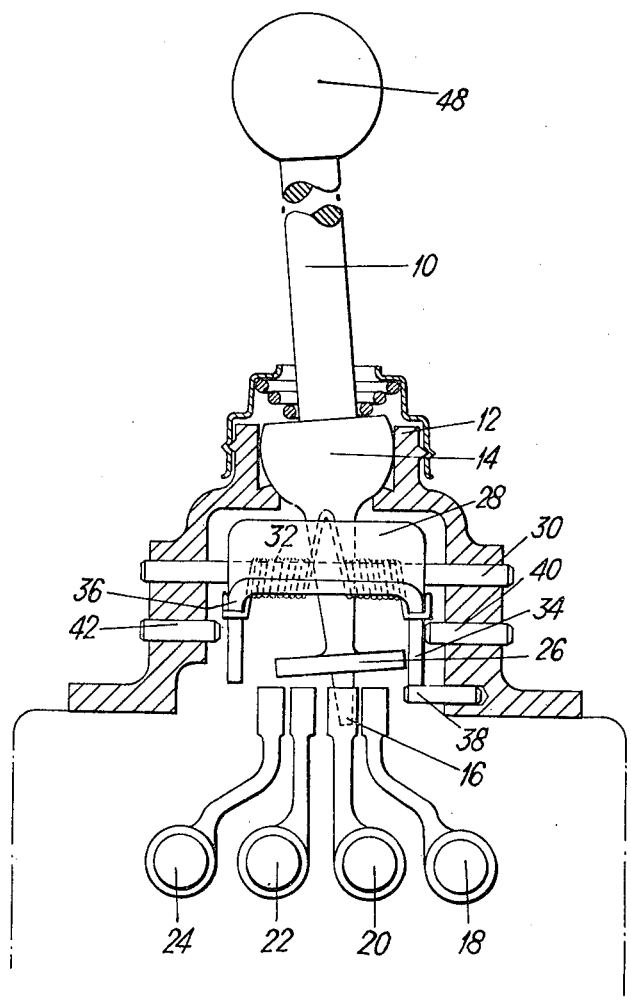
FIGURE 1 is a fragmentary transverse section of one embodiment of a gearshift mechanism according to the present invention, for use with a motor vehicle gearbox giving six forward rations and a reverse ratio.

In the embodiment of a motor vehicle gearshift mechanism according to the invention which is shown in FIGURE 1, a gearshift lever 10 is pivotally mounted intermediate its ends in a fixed turret-like housing 12 by means of a spring-loaded ball mounting 14, and is manually movable on the plane of the paper in FIGURE 1 to bring the lower end portion 16 of the gearshift lever into selective engagement with respective recesses in four gear selector members (selector jaws) 18, 20, 22 and 24 which are arranged in a row side by side and are mounted for sliding movement relative to the housing. The gearshift lever 10 is also movable at right angles to the plane of the paper in FIGURE 1 to effect sliding movement of the selected one of the gear selector members, for engagement of the corresponding gear ratio in conventional manner in an associated gearbox (not shown) constructed to give six forward ratios and a reverse ratio. The gear selector member 18, which is one of the outermost members, controls the reverse and first ratios; the next gear selector member 20, namely one of the inner members, controls the second and third ratios; the other inner gear selector member 22 controls the fourth and fifth ratio; and the other outermost gear selector member 24 controls the sixth ratio which is an overdrive ratio.

The gearshift lever 10 has, adjacent its lower end portion 16, a projecting, generally rectangular abutment portion 26. A U-shaped stop plate 28 is pivotally mounted in the housing 12 by means of a pivot pin 30 which is carried by the stop member in the region of the base of the U and extends into opposed apertures in the housing. As best seen in FIGURES 2 and 3, a mouse-trap spring 32 is mounted on the pivot pin 30; this spring includes a V-shaped central portion which engages the housing 12, and respective end portions which engage the arms 34 and 36 of the U-shaped pivotally mounted stop plate 28 to bias the stop plate in a downward direction into a first, rest position as shown, in which the arm 34 engages a stop pin 38 projecting from the housing. In this first position of the U-shaped stop plate 28, the arms 34 and 36 of the U are disposed between, and closely adjacent to, a coaxially opposed pair of locating pins (reaction pins) 40 and 42 which project from the housing 12.

As shown in FIGURE 2, a Bowden cable 44 is connected to the arm 34 of the U-shaped stop plate 28, and extends through a cable sheath 46 which has a screw-threaded connection at one end to the housing 12; the other end of the Bowden cable is connected to a finger trigger lever (not shown) disposed adjacent a manual control knob 48 at the upper end of the gearshift lever 10. The finger trigger lever is operable to move the Bowden cable in the direction of the arrow 50 shown in FIGURE 2, and thereby lift the pivotablly mounted stop plate 28 from its position into a second position which is shown in interrupted lines in FIGURE 2.

When the pivolally mounted U-shaped stop plate 28 is in its first, lower position as shown in FIGURE 1, the abutment portion 26 on the gearshift lever 10 is disposed in the region between the two arms 34 and 36 of the U, whereby selection movement of the gearshift lever in the plane of the paper in FIGURE 1 is limited to the two inner selector members 20 and 22, that is the selector members corresponding to the second and fifth forward ratios: inadvertent selection of the two outermost selector members 18 and 24 is prevented by engagement of the the abutment portion 26 on the gearshift lever 10 with one or other of the arms 34 and 36 of the stop plate, with reaction to lateral movement of the arms being provided by the pins 40 and 42 respectively. The U-shaped stop plate in its first, rest position thus facilitates gear shifting in the commonly used range of second to fifth forward ratios, since it forms a positive bulk preventing those gearshift movements which are required only infrequently namely shifts into the reverse ratio, into the first forward ratio, and into the overdrive sixth ratio.

For a gearshift into reverse ratio, first forward ratio or overdrive sixth ratio, the trigger lever adjacent the control knob 48 most be operated. The U-shaped stop plate is thereby caused to pivot upwards, in opposition to the bias of its spring 32, into the second position which is shown in interrupted lines in FIGURE 2; in this position the arms 34 and 36 of the U-shaped stop plate are clear of the arc of movement of the abutment portion 26 on the gearshift lever, so allowing further movement of the abutment portion 26, as indicated by way of example in interrupted lines in FIGURE 3, for selection of the full range of six forward ratios and one reverse ratio. When the trigger lever is released, the spring 32 returns the U-shaped stop plate 28 to its rest position, in which the arm 34 engages the stop pin 38, and the stop plate is effective to baulk the infrequently used gearshift movements, as already described.

With this gearshift mechanism, the baulking arrangement is readilly operated; also the baulking arrangement has a positive action which ensures that the baulking action is not inadvertently overcome in a rapid gearshift; further, the baulking arrangement does not involve excessive effort for selection of the outermost selector members.

We claim:

1. A gearshift mechanism for a transmission having a plurality of gear ratios comprising a housing for said transmission, a plurality of gear selector members movably mounted in said housing for changing the gear ratios of said transmission, a gearshift lever having a selector member actuating portion, pivot means pivotally mounting said lever in said housing so that said actuating portion of said lever is disposed within said housing and is movable into engagement with any selected one of said gearshift members, said lever having a contact portion, a stop member having stop portions disposed on opposite sides of said lever, mounting means pivotally mounting said stop member within said housing for movement longitudinal of said lever between a first position in which said stop member is aligned with said contact portion to limit the movement of said lever so that said gearshift lever is blocked from engagement with a first of said selector members and a second position in which said stop member is out of alignment with said contact portion so that said lever can be moved into engagement with the first of said selector members, yieldable means for urging said stop member to one of said positions, and a control member operatively connected to said stop member for moving said stop member into the other one of said positions.

2. A gearshift mechanism according to claim 1 wherein the stop portions are so spaced that the stop member in its first position also prevents engagement of the gearshift lever with a second one of the gear selector members.

3. A gearshift mechanism according to claim 2, wherein the first and second gear selector members compirse the two outermost ones of a row of gear selector members.

4. A gearshift mechanism according to claim 2, wherein said selector members comprise open jaw means for receiving said actuating portion of said lever, said jaw means being positionable in a row side by side, with the first gear selector member comprising one of the outermost members and being arranged for selecting reverse and first ratio, and the second gear selector member comprising the other outer-most member and being arranged for selecting the sixth forward ratio.

5. A gearshift mechanism according to claim 4, a separate rail in said housing for supporting each of said jaw means and wherein the sixth forward ratio is an overdrive ratio.

6. A gearshift mechanism according to claim 1, wherein the gear selector members are mounted for sliding movement relative to the housing.

7. A gearshift mechanism according to claim 1, wherein the stop member comprises a U-shaped plate.

8. A gearshift mechanism according to claim 7 wherein the stop member is pivotally mounted in the housing by means of a pivot disposed in the region of the base of the U-shaped plate.

9. A gearshift mechanism according to claim 8, wherein the pivot for the U-shaped stop member compirses a pivot pin carried by the stop member in the region of the base of the U-shaped plate.

10. A gearshift mechanism according to claim 9, wherein said yieldable means for said stop member is a mousetrap spring mounted on the pivot pin forming the pivotal mounting for the stop member.

11. A gearshift mechanism according to claim 8, wherein the contact portion comprises a projecting abutment portion which, in the first position of the U-shaped stop member, is disposed in the region between the arms of the U, for engagement with one or other of the arms to prevent the engagement of the gearshift lever with the corresponding gear selector member.

12. A gearshift mechanism according to claim 11, wherein an opposed pair of pins project from the housing in which the stop member is pivotally mounted, the pins being arranged to provide reaction for the arms of the U-shaped member when the arms are engaged by the gearshift lever.

13. A gearshift mechanism according to claim 1, wherein said yieldable means is a spring for biasing said stop member to one of said positions and wherein the pivotal movement of the stop member from its first to its second position, in opposition to the bias of the spring, is an upward movement.

14. A gearshift mechanism according to claim 1, wherein the control member for moving the stop member from its first to its second position comprises a control cable.

15. A gearshift mechanism according to claim 14, wherein the control cable extends through a cable sheath which is connected to the housing.

16. A gearshift mechanism according to claim 1, wherein the gearshift lever is formed with a manual control knob at the upper end portion of the lever, and the control member is operable from a position adjacent the manual control knob of the gearshift lever.

References Cited

UNITED STATES PATENTS

| 1,951,876 | 3/1934 | Lapsley | 74—476 X |
| 2,027,442 | 1/1936 | Lapsley | 74—475 |
| 3,082,638 | 3/1963 | Nilson | 74—476 X |

MILTON KAUFMAN, Primary Examiner